US009601158B2

(12) United States Patent
Nishizaka

(10) Patent No.: US 9,601,158 B2
(45) Date of Patent: Mar. 21, 2017

(54) MOVING IMAGE SELECTION APPARATUS FOR SELECTING MOVING IMAGE TO BE COMBINED, MOVING IMAGE SELECTION METHOD, AND STORAGE MEDIUM

(71) Applicant: CASIO COMPUTER CO., LTD., Shibuya-ku, Tokyo (JP)

(72) Inventor: Nobuyoshi Nishizaka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 163 days.

(21) Appl. No.: 14/471,549

(22) Filed: Aug. 28, 2014

(65) Prior Publication Data
US 2015/0078731 A1 Mar. 19, 2015

(30) Foreign Application Priority Data
Sep. 17, 2013 (JP) .................... 2013-191521

(51) Int. Cl.
| | |
|---|---|
| *H04N 5/93* | (2006.01) |
| *G11B 27/00* | (2006.01) |
| *G11B 27/06* | (2006.01) |
| *G11B 27/34* | (2006.01) |
| *G11B 27/034* | (2006.01) |

(52) U.S. Cl.
CPC ............ *G11B 27/06* (2013.01); *G11B 27/005* (2013.01); *G11B 27/034* (2013.01); *G11B 27/34* (2013.01)

(58) Field of Classification Search
CPC ..................................................... G11B 27/06
USPC ................................................ 386/284, 278
See application file for complete search history.

(56) References Cited

U.S. PATENT DOCUMENTS

2006/0044466 A1* 3/2006 Kelly ................ G06F 17/30126
348/441
2014/0101551 A1* 4/2014 Sherrets ............. H04N 21/2743
715/723

FOREIGN PATENT DOCUMENTS

| JP | 2000115685 A | 4/2000 |
|---|---|---|
| JP | 3172496 B2 | 6/2001 |
| JP | 2005086218 A | 3/2005 |
| JP | 2012165050 A | 8/2012 |

OTHER PUBLICATIONS

Japanese Office Action dated Jan. 13, 2015, issued in counterpart Japanese Application No. 2013-191521.

* cited by examiner

*Primary Examiner* — Hung Dang
*Assistant Examiner* — Girumsew Wendmagegn
(74) *Attorney, Agent, or Firm* — Holtz, Holtz & Volek PC

(57) ABSTRACT

An image capture apparatus includes a combination candidate selection processing unit. When one moving image is generated by combining a plurality of moving images, the combination candidate selection processing unit judges a possibility of combination between a moving image which is a basis for combination chosen and another moving image based on a predetermined condition. Furthermore, the combination candidate selection processing unit selects, as a candidate of a moving image for a combination target, a moving image that can be combined with the moving image which is a basis for combination, from among other moving images based on a judgment result.

12 Claims, 6 Drawing Sheets

FIG. 3A

| TYPE | IMAGE SIZE (pixels) | PHOTOGRAPHING FRAME RATE (fps) | REPLAY FRAME RATE (fps) |
|---|---|---|---|
| STANDARD | 640 × 480 | 30 | 30 |
| HIGH RESOLUTION | 1920 × 1080 | 30 | 30 |
| HIGH SPEED 1000 | 224 × 64 | 1000 | 30 SLOW/ NORMAL SWITCHABLE |
| HIGH SPEED 480 | 224 × 160 | 480 | 30 SLOW/ NORMAL SWITCHABLE |
| HIGH SPEED 240 | 512 × 384 | 240 | 30 SLOW/ NORMAL SWITCHABLE |
| HIGH SPEED 120 | 640 × 480 | 120 | 30 SLOW/ NORMAL SWITCHABLE |
| STANDARD TIME LAPSE | 640 × 480 | VARY ACCORDING TO SETTING | 30 |
| HIGH RESOLUTION TIME LAPSE | 1920 × 1080 | VARY ACCORDING TO SETTING | 30 |
| STANDARD ART SHOT | 640 × 480 | 30 | 30 |
| HIGH RESOLUTION ART SHOT | 1280 × 720 | 20 | 20 |

* ART SHOT: TOY CAMERA, SOFT FOCUS, LIGHT TONE, POP, SEPIA, MONOCHROME, MINIATURE, FISH EYE, ETC.

FIG. 3B

| BASIS FOR COMBINATION \ COMBINATION TARGET | STANDARD | HIGH RESOLUTION | HIGH SPEED 1000 | HIGH SPEED 480 | HIGH SPEED 240 | HIGH SPEED 120 | STANDARD TIME LAPSE | HIGH RESOLUTION TIME LAPSE | STANDARD ART SHOT | HIGH RESOLUTION ART SHOT |
|---|---|---|---|---|---|---|---|---|---|---|
| STANDARD | O | × | × | × | × | × | O | × | O | × |
| HIGH RESOLUTION | × | O | × | × | × | × | × | O | × | × |
| HIGH SPEED 1000 | × | × | O | × | × | × | × | × | × | × |
| HIGH SPEED 480 | × | × | × | O | × | × | × | × | × | × |
| HIGH SPEED 240 | × | × | × | × | O | × | × | × | × | × |
| HIGH SPEED 120 | × | × | × | × | × | O | × | × | × | × |
| STANDARD TIME LAPSE | O | × | × | × | × | × | O | × | × | × |
| HIGH RESOLUTION TIME LAPSE | × | O | × | × | × | × | × | O | × | × |
| STANDARD ART SHOT | O | × | × | × | × | × | × | × | O | × |
| HIGH RESOLUTION ART SHOT | × | × | × | × | × | × | × | × | × | O |

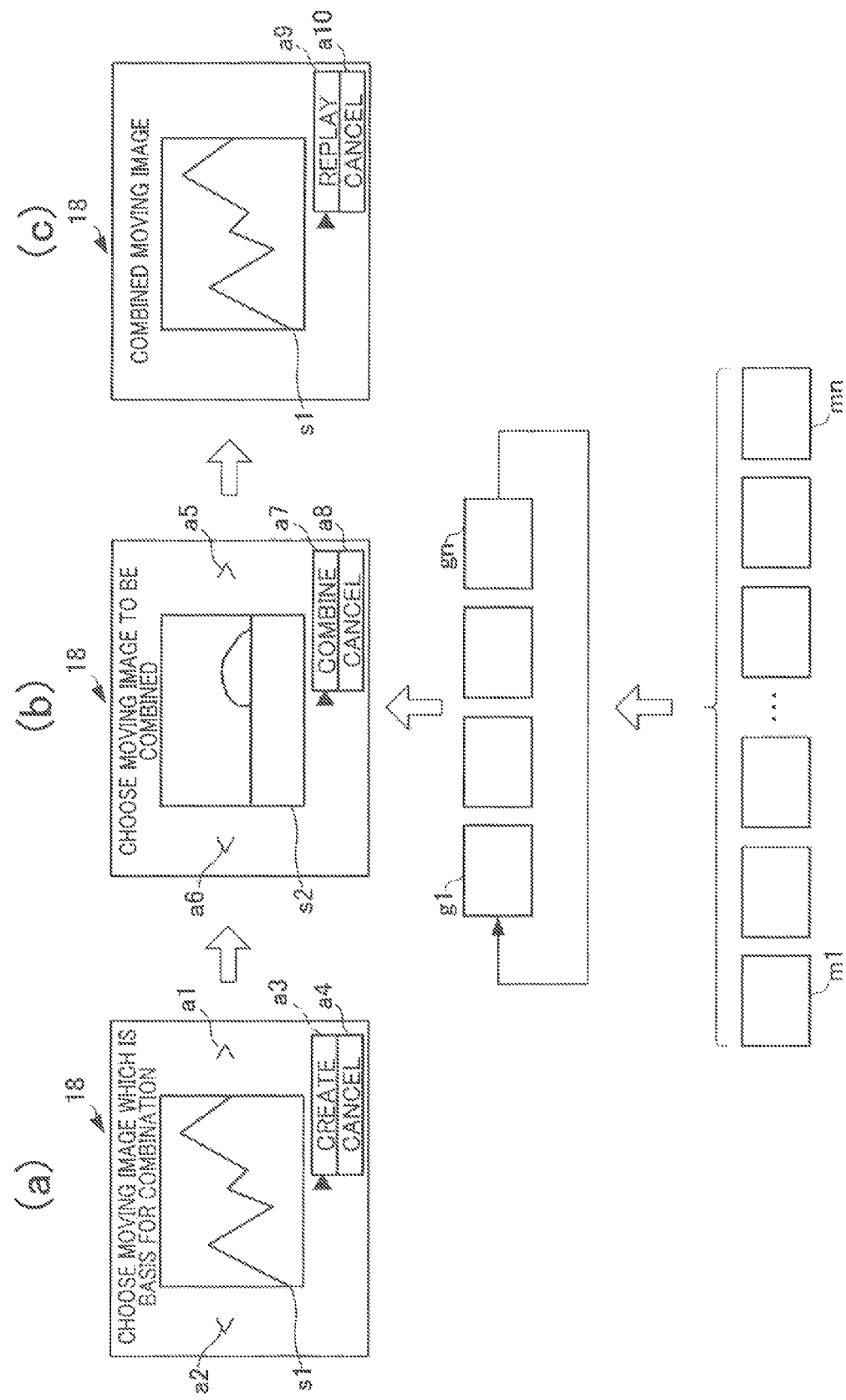

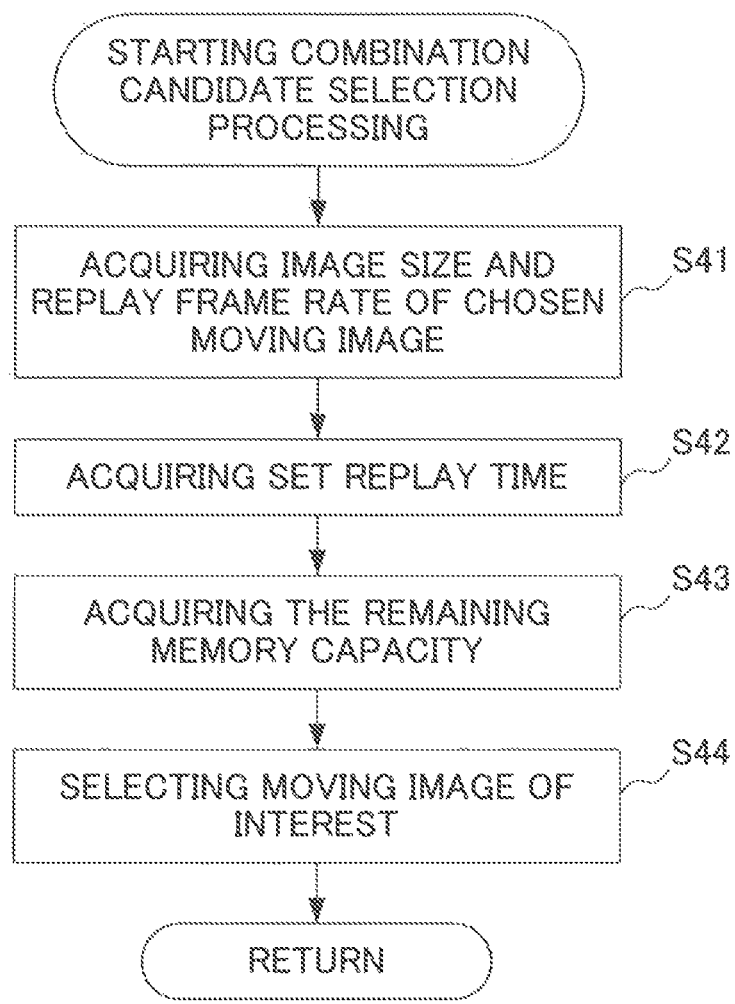

MOVING IMAGE SELECTION APPARATUS FOR SELECTING MOVING IMAGE TO BE COMBINED, MOVING IMAGE SELECTION METHOD, AND STORAGE MEDIUM

This application is based on and claims the benefit of priority from Japanese Patent Application No. 2013-191521, filed on 17 Sep. 2013, the content of which is incorporated herein by reference.

BACKGROUND OF THE INVENTION

Field of the Invention

The present invention relates to a moving image selection apparatus, a moving image selection method, and a storage medium.

Related Art

Conventionally, a moving image is generated by combining a plurality of moving images photographed individually. For example, as a technology of combining a plurality of moving images, a technology that improves operability is disclosed in Japanese Unexamined Patent Application, Publication No. 2005-86218.

SUMMARY OF THE INVENTION

A moving image selection apparatus according to a first aspect of the present invention includes a moving image judgment section that, when one moving image is generated by combining a plurality of moving images, judges a possibility of combination between a moving image which is a basis for combination chosen and another moving image based on a predetermined condition; and a candidate selection section that, based on a judgment result from the moving image judgment section, selects, as a candidate of a moving image for a combination target, a moving image that can be combined with the moving image which is a basis for combination, from among other moving images.

A moving image selection method according to a second aspect of the present invention includes: a moving image judgment processing that, when one moving image is generated by combining a plurality of moving images, judges a possibility of combination between a moving image which is a basis for combination chosen and another moving image based on a predetermined condition; and a candidate selection processing that, based on a judgment result from the moving image judgment processing, selects, as a candidate of a moving image for a combination target, a moving image that can be combined with the moving image which is a basis for combination, from among other moving images.

A non-transitory storage medium encoded with a computer-readable program according to a third aspect of the present invention enables a computer to execute functions as: a moving image judgment function that, when one moving image is generated by combining a plurality of moving images, judges a possibility of combination between a moving image which is a basis for combination chosen and another moving image based on a predetermined condition; and a candidate selection function that, based on a judgment result from the moving image judgment function, selects, as a candidate of a moving image for a combination target, a moving image that can be combined with the moving image which is a basis for combination, from among other moving images.

BRIEF DESCRIPTION OF THE DRAWINGS

FIGS. 3A and 3B are views illustrating combination correspondence tables;

FIG. 4 is view of display example relating to a combination of moving images displayed and outputted to an output unit;

FIG. 6 is a flowchart illustrating the detailed flow of combination candidate selection processing among moving image combination processing.

DETAILED DESCRIPTION OF THE INVENTION

Embodiments of the present invention are explained below with reference to the drawings.

Figure 1:
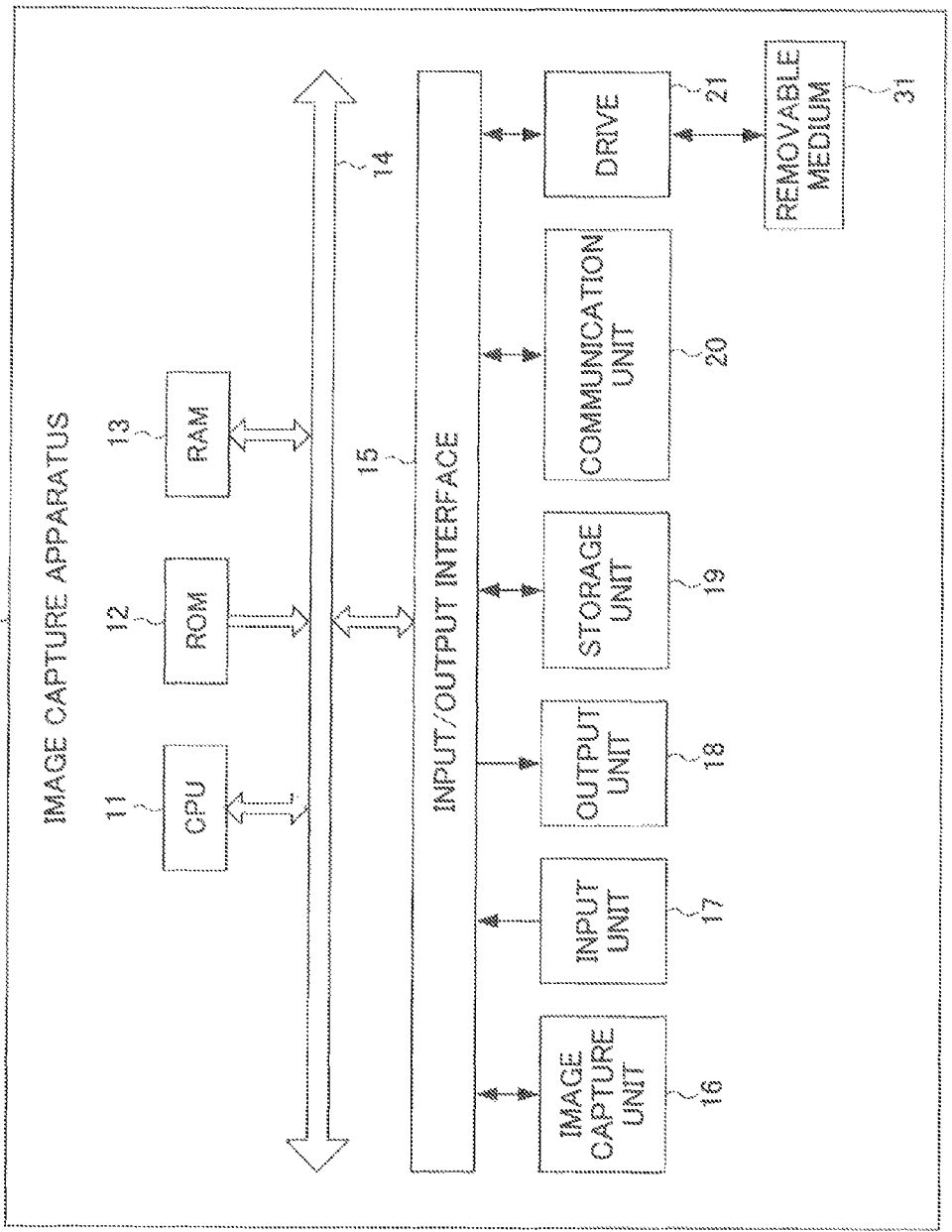
FIG. 1 is a block diagram showing a hardware configuration of an image capture apparatus according to an embodiment of the present invention.

FIG. 1 is a block diagram showing the hardware configuration of an image capture apparatus 1 according to an embodiment of the present invention.

The image capture apparatus 1 is configured as, for example, a digital camera.

The image capture apparatus 1 include a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor, which are not shown.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

With the image capture unit 16, it is possible to perform control of auto focus (AF), control of auto exposure (AE) and auto white balance (AWB) by adjusting the optical lens unit.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a captured image". Data of a captured image is supplied to the CPU 11, an image processing unit (not illustrated), and the like as appropriate.

The input unit 18 is configured by various buttons such as for the shutter, and the like, and inputs a variety of information in accordance with instruction operations by the user.

The output unit 18 is configured by the display unit, a speaker, and the like, and outputs images and sound.

The storage unit 19 is configured by DRAM (Dynamic Random Access Memory) or the like, and stores data of various images.

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

Such an image capture apparatus 1 has a function that can generate one moving image by combining a plurality of moving images. Upon generating one moving image, the image capture apparatus 1 has a function of displaying and outputting moving images that can be combined in such a manner to be choosable by a user. Since the moving images that can be combined are displayed and outputted so as to be choosable, the user can smoothly perform an operation of combining moving images.

Figure 2:
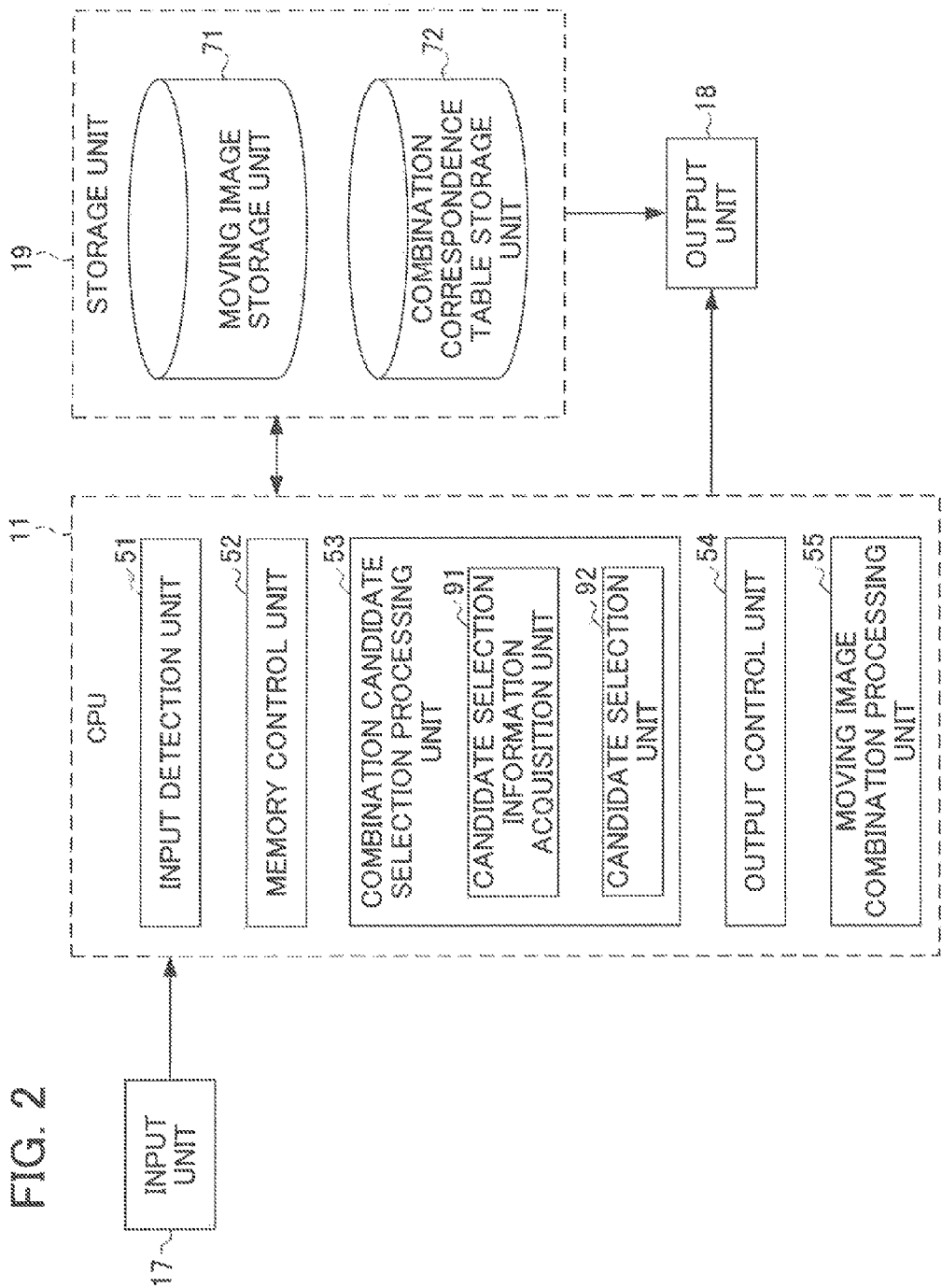
FIG. 2 is a functional block diagram showing a functional configuration for executing moving image combination processing, among the functional configurations of an image capture apparatus of FIG. 1.

FIG. 2 is a functional block diagram showing a functional configuration for executing moving image combination processing, among the functional configurations of the image capture apparatus 1 having such a function.

Here, "moving image combination processing" refers to processing of choosing a moving image which is a basis for combination from moving images photographed according a user operation, selecting candidates of moving images that can be combined with the moving image which is a basis for combination (hereinafter, referred to as "combination candidate selection processing"), and combining the moving image which is a basis for combination with a candidate of a moving image that can be combined thus selected, thereby generating a moving image.

For executing the moving image combination processing, the CPU 11 includes an input detection unit 51, a memory control unit 52, a combination candidate selection processing unit 53, an output control unit 54, and a moving image combination processing unit 55.

Furthermore, in an area of the storage unit 19, a moving image storage unit 71 and a combination correspondence table storage unit 72 are provided.

Moving images and thumbnail images corresponding to the moving images are stored in the moving image storage unit 71. Furthermore, regarding moving images to be stored, additional information is stored which relates to moving images such as image size, photographing frame rate, time stamp including replay frame rate and photographed time/file generated time, etc., at a header portion.

A combination correspondence table is stored in the combination correspondence table storage unit 72.

Here, the combination correspondence table stored in the combination correspondence table storage unit 72 is explained.

FIGS. 3A and 3B illustrate the combination correspondence tables stored in the combination correspondence table storage unit 72.

In the image capture apparatus 1 according to the present embodiment, it is possible to handle predetermined photographic conditions and various types of moving images. More specifically, the types of moving images that can be handled include "standard", "high resolution", "high speed 1000", "high speed 480", "high speed 240", "high speed 120", "standard time lapse", "high resolution time lapse", "standard art shot", and "high resolution art shot", as shown in FIG. 3A. Time lapse of "standard time lapse" and "high resolution time lapse" refers to a moving image made by joining a plurality of images photographed with a constant time interval that is set so that a replay time thereof becomes shorter than the photographed time, and the moving image is viewed as if being replayed in a fast-forward manner. Art shot of "standard art shot" and "high resolution art shot" collectively refers to art shots to which an effect such as toy camera, soft focus, light tone, pop, sepia, monochrome, miniature, fish eye, etc. is added.

To explain in detail individually, "standard" is "image size (pixels): 640×480", "photographing frame rate (fps): 30" and "replay frame rate (fps): 30". Furthermore, "high resolution" is "image size (pixels): 1920×1080", "photographic frame rate (fps): 30", and "replay frame rate (fps): 30".

"High speed 1000" is "image size (pixels): 224×64", "photographing frame rate (fps): 1000)", and "replay frame rate (fps): 30 slow/normal switchable". Furthermore, "high speed 480" is "image size (pixels): 224×160", "photographing frame rate (fps): 480", and "replay frame rate (fps): 30 slow/normal switchable". Furthermore, "high speed 240" is "image size (pixels): 512×384", "photographing frame rate (fps): 240", and "replay frame rate (fps): 30 slow/normal switchable". Furthermore, "high speed 120" is "image size (pixels): 640×480", "photographing frame rate (fps): 120", and "replay frame rate (fps): 30 slow/normal switchable".

"Standard time lapse" is "image size (pixels): 640×480", "photographing frame rate (fps): vary according to setting", and "replay frame rate (fps): 30". Furthermore, "high resolution time lapse" is "image size (pixels): 1920×1080", "photographing frame rate (fps): vary according to setting", and "replay frame rate (fps): 30".

"Standard art shot" is "image size (pixels): 640×480", "photographing frame rate (fps): 30", and "replay frame rate (fps): 30". Furthermore, "high resolution art shot" is "image size (pixels): 1280×720", "photographing frame rate (fps): 20", and "replay frame rate (fps): 20".

In the image capture apparatus 1 that combines the above such moving images that can be handled with each other, from the viewpoint of processing load in combining moving images and the viewpoint of a disadvantage in the case of being combined, only moving images with combinations of predetermined conditions are treated as moving images that can be combined. In the present embodiment, it is configured so that moving images can be combined so long as the image sizes and the replay frame rates are the same, irrespective of the moving images being the same type or different types.

Combinations of moving images that can be combined are managed with the combination correspondence table shown in FIG. 3B. The combination correspondence table is a table showing whether it is possible to combine a moving image which is a basis for combination with a moving image that is a combination target to be combined with the moving image which is a basis for combination. In the table, "∘" indicates combinable and "x" indicates "not combinable".

More specifically, in "standard", "standard", "standard time lapse", and "standard art shot" are moving images that can be combined irrespective of the photographing frame rate.

In "high resolution", "high resolution" and "high resolution time lapse" can be combined.

In "standard time lapse", "standard" and "standard time lapse" are moving images that can be combined.

In "high resolution time lapse", "high resolution" and "high resolution time lapse" are moving images that can be combined irrespective of a photographing frame rate.

In "standard art shot", "standard" and "standard art shot" are moving images that can be combined.

In the remaining "high speed 1000", "high speed 480", "high speed 240", "high speed 120", and "high resolution art shot", only moving images of the same type can be combined.

In the image capture apparatus 1, a moving image which is a basis for combination and moving images that can be combined are selected based on the abovementioned combination correspondence table.

With reference to FIG. 2 again, the input detection unit 51 detects an input operation of a user to the input unit 17. The input detection unit 51 instructs a choice or determination of a moving image based on the input operation thus detected.

The memory control unit 52 performs control of capacity of memory in the storage unit 19 (for example, estimating remaining memory amount). More specifically, in a case in which there was an instruction to combine moving images, in a case of being combined with a moving image which is a basis for combination, or in a case of a moving image of a combination target being chosen, the memory control unit 52 controls whether a surplus capacity of memory remains.

The combination candidate selection processing unit 53 executes combination candidate selection processing.

Here, "combination candidate selection processing" refers to processing of selecting a moving image that can be combined with a moving image which is a basis for combination from among moving images stored.

Furthermore, the combination candidate selection processing unit 53 includes a candidate selection information acquisition unit 91 and a candidate selection unit 92.

The candidate selection information acquisition unit 91 acquires information relating to candidate selection (hereinafter, referred to as "candidate selection information"). More specifically, the candidate selection information acquisition unit 91 acquires additional information of a moving image such as the image size and replay frame rate of a moving image stored in the moving image storage unit 71 as candidate selection information, acquires additional information of a moving image with a replay time set, and acquires a remaining capacity of memory of the storage unit 19.

The candidate selection unit 92 selects a moving image stored in the moving image storage unit 71, based on candidate selection information such as additional information of a moving image, a remaining capacity of memory of the storage unit 19, etc.

The output control unit 54 controls the output unit 18 to display and output thumbnail images of moving images stored in the moving image storage unit 71.

More specifically, among the moving images stored in the moving image storage unit 71, the output control unit 54 controls the output unit 18 to display and output a thumbnail image of a moving image which is a basis for combination, a thumbnail image of a moving image selected as a candidate for combination, a thumbnail image of a moving image combined, etc. Furthermore, the output control unit 54 controls the output unit 18 to replay and output a moving image.

FIG. 4 is view showing display example relating to combination of moving images that is displayed and outputted to the output unit 18.

Display relating to combination of moving images selectively performs display of a thumbnail image of a moving image which is a basis for combination, indicating a moving image for a basis for combination. It then selectively performs display of a thumbnail image of a moving image that can be combined, indicating a moving image that can be combined with a moving image which is a basis for combination. It also performs display of a thumbnail image of a moving image combined after the combination of the moving image which is a basis for combination and the moving image thus selected.

More specifically, as shown in FIG. 4(a), display relating to combination of moving images performs display of a display screen of a thumbnail image s1 of a moving image which is a basis for combination. In the example of FIG. 4(a), the thumbnail image s1 of a moving image in which mountain scenery is photographed is displayed.

A user chooses a moving image which is a basis for combination from among a plurality of moving images by way of a selecting operation to the input unit 17 via a thumbnail image corresponding to the moving image. In a case of displaying a moving image which is a basis for combination from among the plurality of moving images, the user chooses a Forward icon a1 or a Back icon a2. Furthermore, in a case of choosing a moving image corresponding to the thumbnail image s1 being displayed as a moving image which is a basis for combination, the user chooses a Create icon a3. On the other hand, in a case of not performing combination of moving images, the user chooses a Cancel icon a4.

Next, the screen transitions to a selection screen of a moving image as a combination target as shown in FIG. 4(b). In the example of FIG. 4(b), a thumbnail image s2 of a moving image in which an ocean is photographed from among a plurality of moving images that can be combined is displayed.

In a selection screen of a moving image as a combination target, a plurality of thumbnail images g1 to gn of moving images as candidates of moving images as a combination target that can be combined with a moving image which is a basis for combination, from among a plurality of moving images m1 to mn stored, is displayed selectively. The user chooses a moving image as a combination target from among the plurality of moving images m1 to mn by way of an selecting operation to the input unit 17 via thumbnail images g1 to gn corresponding to the moving images. In a case of displaying a moving image as a combination target from among the plurality of moving images, the user chooses a Forward icon a5 or a Back icon a6. Furthermore, in a case of selecting a moving image corresponding to a thumbnail s2 being displayed as a moving image which is a basis for combination, the user chooses a Combine icon a7. On the other hand, in a case of not performing a combination of moving images, the user chooses a Cancel icon a8.

In a case of performing a combination of moving images, as shown in FIG. 4(c), a thumbnail image s1 corresponding to a moving image thus combined is displayed. In the example of FIG. 4(c), the thumbnail image s1 of the moving image which is a basis for combination is displayed. It should be noted that it is configured such that the user can arbitrarily choose which thumbnail image to be displayed after the combination.

In a case of replaying the moving image thus combined, the user chooses a Replay icon a9, and in a case of not replaying, the user chooses a Cancel icon a10.

Furthermore, in the present example, although moving images are selectively displayed one by one, it may be configured so as to display a plurality of moving images in a list. Furthermore, in the present example, although only moving images that can be combined are displayed, it may be configured so as to display moving images that cannot be combined in a non-choosable manner. In such a case, it may be configured, for example, so as to perform gray-out display, for example, to indicate that the moving images cannot be combined.

With reference to FIG. 2 again, the moving image combination processing unit 55 performs processing of combining a plurality of moving images into one moving image. More specifically, the moving image combination processing unit 55 couples and combines a moving image which is a basis for combination with a moving image determined as a moving image to be combined, thereby combining into one moving image. Upon combining moving images, the moving image combination processing unit 55 performs combining with a condition employed by the user (for example, a combined position of either the moving image which is a basis for combination or the moving image as a combination target, time stamp, types of moving images, etc.) and performs rewriting additional information relating to moving images such as image size, photographing frame rate, replay frame rate, time stamp including replay frame rate and photographed time/file generated time, etc., at a header portion of a moving image.

Furthermore, in the present embodiment, the moving image combination processing unit 55 does not combine three or more moving images by one-time combination processing. However, it is configured such that three or more moving images can be combined by combining a moving image with a moving image that has already been combined. It should also be noted that, although it is configured such that three or more moving images are not combined by one-time combination processing, it may be configured such that two or more moving images are combined by one-time combination processing.

Next, the flow of the moving image combination processing executed by such an image capture apparatus 1 is explained.

Figure 5:
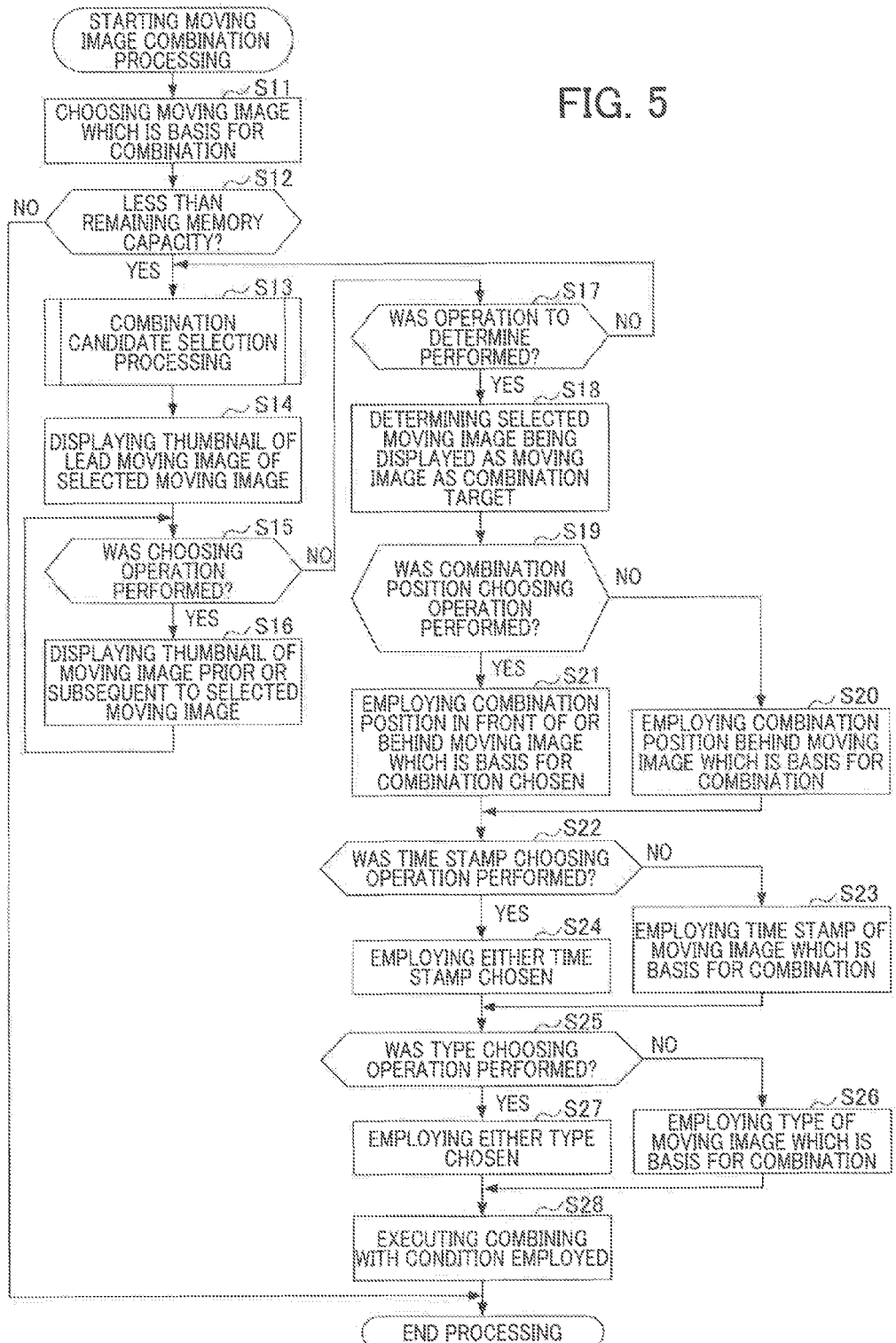
FIG. 5 is a flowchart illustrating the flow of moving image combination processing executed by the image capture apparatus of FIG. 1 having the functional configuration of FIG. 2.

FIG. 5 is a flowchart illustrating the flow of moving image combination processing executed by the image capture apparatus 1 of FIG. 1 having the functional configuration of FIG. 2.

The moving image combination processing is executed by an operation to start the moving image combination processing to the input unit 17 by the user.

In Step S11, the user chooses, from among moving images displayed at the output unit 18 in a choosable manner, a moving image which is a basis for combination using the Forward icon a1 or the Back icon a2 shown in FIG. 4(a). In other words, the input detection unit 51 detects an operation to select a moving image which is a basis for combination to the input unit 17. In the output unit 18, although thumbnail images of moving images to be a basis for combination (hereinafter, simply referred to as "thumbnail") are displayed in a choosable manner, it can be configured so as to exclude moving images that cause over quota upon combining from a choice candidates beforehand.

More specifically, as shown in FIG. 4(a), since thumbnails of moving images to be a basis for combination are displayed selectively, it is possible for a user to perform an operation of combining moving images smoothly.

In Step S12, in a case of being combined with a moving image which is a basis for combination chosen, the memory control unit 52 judges whether the size of the moving image to be stored in the moving image storage unit 71 is smaller than the size of the remaining capacity of memory (less than the remaining capacity of memory).

In a case of being less than the remaining storage capacity, it is judged as NO in Step S12 and the moving image combination processing ends.

In a case of being not less than the remaining capacity of memory, it is judges as YES in Step S12, and the processing advances to Step S13.

In Step S13, the combination candidate selection processing unit 53 executes combination candidate selection processing. The detailed flow of processing of the combination candidate selection processing is described later.

In Step S14, the output unit 18 displays a thumbnail of a lead moving image of a moving image serving as a candidate of a combination target selected as a result of the combination candidate selection processing (hereinafter, referred to as "selected moving image"). In other words, the output control unit 54 controls the output unit 18 so as to display and output the thumbnail of the lead moving image of the selected moving images.

More specifically, as shown in FIG. 4(b), since the thumbnails of the selected moving images are displayed selectively, it is possible for the user to perform an operation to combine moving images smoothly.

In Step S15, the input detection unit 51 judges whether a choosing operation was performed on the input unit 17.

In a case of the choosing operation not being performed, it is judged as NO in Step S15, and the processing advances to Step S17. The processing of Steps S17 and higher is described later.

In a case in which the choosing operation is performed using the Forward icon a5 or the Back icon a6 shown in FIG. 4(b), it is judged as YES in Step S15, and the processing advances to Step S16.

If there is not another selected moving image, the Forward icon a5 and the Back icon a6 shown in FIG. 4(b) are set to be hidden or gray-out display.

In Step S16, the output unit 18 displays a thumbnail of a prior or subsequent selected moving image. In other words, the output control unit 54 controls the output unit 18 so as to display and output a thumbnail image of a prior or subsequent selected moving image.

Subsequently, the processing returns to Step S15.

In Step S17, it is judged whether the user performed an operation to determine a moving image as a combination target from among the selected moving images being displayed. In other words, the input detection unit 51 detects an operation to determine that the Combine icon a7 shown in FIG. 4(b) was used by the user on the input unit 17.

In a case of the operation to determine not being performed, it is judged as NO in Step S17, and the processing returns to Step S13.

In a case of the operation to determine being performed, it is judged as YES in Step S17, and the processing advances to Step S18.

In Step S18, the input detection unit 51 determines the selected moving image being displayed as a moving image as a combination target.

In Step S19, it is judged whether the user performed an operation to set that the moving image as a combination target was coupled and combined in front of or behind the moving image which is a basis for combination (hereinafter, referred to as "combination position setting operation"). In other words, the input detection unit 51 judges whether the user performs the combination position setting operation on the input unit 17.

In a case of the combination position setting operation not having been performed, it is judged as NO in Step S19 and the processing advances to Step S20.

In Step S20, the moving image combination processing unit 55 employs the combination position behind the moving image which is a basis for combination. Subsequently, the processing advances to Step S22. The processing of Steps S22 and higher is described later.

On the other hand, in a case of the combination position setting operation being performed, it is judged as YES in Step S19, and the processing advances to Step S21.

In Step S21, the moving image combination processing unit 55 employs the combination position in front of or behind the moving image which is a basis for combination chosen.

In Step S22, it is judged whether the user performed an operation to choose that either the time stamp of the moving image which is a basis for combination or of the moving image as a combination target is employed. The input detection unit 51 detects a choosing operation of the time stamp on the input unit 17.

In a case of the choosing operation of the time stamp not being performed, it is judged as NO in Step S22, and the processing advances to Step S23.

In Step S23, the moving image combination processing unit 55 employs the time stamp of the moving image which is a basis for combination. Subsequently, the processing advances to Step S25. The processing of Steps S25 and higher is described later.

On the other hand, in the case of the choosing operation of the time stamp being performed, it is judged as YES in Step S22, and the processing advances to Step S24.

In Step S24, the moving image combination processing unit 55 employs the time stamp chosen (either of the time stamp of the moving image which is a basis for combination or the moving image for a combination target).

In Step S25, it is judged whether the user performed an operation to employ the choice of either type of the moving image which is a basis for combination or the moving image for a combination target. In other words, the input detection unit 51 judges whether there was a type choosing operation on the input unit 17.

In a case of the type choosing operation not being performed, it is judged as NO in Step S25, and the processing advances to Step S26.

In Step S26, the moving image combination processing unit 55 employs the type of the moving image which is a basis for combination. Subsequently, the processing advances to Step S28. The processing of Steps S28 is described later.

On the other hand, in a case of the type choosing operation being performed, it is judged as YES in Step S25, and the processing advances to Step S27.

In Step S27, the moving image combination processing unit 55 employs either type of the moving image chosen (either of the moving image which is a basis for combination or the moving image for a combination target).

In Step S28, the moving image combination processing unit 55 executes combination with the conditions thus employed (combination position, time stamp, and type of a moving image). In other words, the moving image combination processing unit 55 generates a moving image by combining moving images with the conditions of a combination position, a time stamp, and a type of the moving images set by the user. Subsequently, the moving image combination processing ends.

FIG. 6 is a view illustrating the detailed flow of combination candidate selection processing, among the moving image combination processing.

In Step S41, the candidate selection information acquisition unit 91 acquires an image size and a replay frame rate of a moving image which is basis for combination chosen.

In Step S42, the candidate selection information acquisition unit 91 acquires a set replay time of a chosen moving image stored in the moving image storage unit 71. More specifically, the candidate selection information acquisition unit 91 acquires a set replay time in a case in which a replay time is additionally set by a user. Additionally, in a case of not being set, a replay frame rate of an initial value is set as a replay time.

In Step S43, the candidate selection information acquisition unit 91 acquires the remaining capacity of memory from the storage unit 19 via the memory control unit 52.

In Step S44, the candidate selection unit 92 selects moving images of interest. More specifically, in consideration of the judgment in the combination table stored in the combination correspondence table storage unit 72 for the chosen moving image based on the information acquired by the candidate selection information acquisition unit 91, the replay time upon being combined, and the remaining capacity of memory, the candidate selection unit 92 selects the moving image of interest (a moving image as a candidate of a moving image as a combination target) from among the moving images stored in the moving image storage unit 71.

Subsequently, the combination candidate selection processing ends.

The moving images combined as such can be replayed similarly to a normal moving image photographed individually.

The image capture apparatus 1 with the abovementioned configuration includes the combination candidate selection processing unit 53.

When combining a plurality of moving images to generate one moving image, the combination candidate selection processing unit 53 judges the possibility of combination between a moving image which is a basis for combination chosen and another moving image based on a predetermined condition.

Furthermore, the combination candidate selection processing unit 53 selects, based on the judgment result, a moving image for a basis for combination and a combinable moving image among other moving images, as a candidate for a moving image.

With such a configuration, with the image capture apparatus 1, since only a moving image appropriate for combination is set to be a candidate, it is possible to prevent a user from choosing an inappropriate moving image and save unnecessary operations. Furthermore, with the image capture apparatus 1, since a moving image which is a basis for combination and a combinable moving image are selected as candidates for a moving image as a combination target, the user presented with the selected result will no longer choose a moving image that cannot be combined, and it is possible to smoothly perform the operation for moving image combination.

Furthermore, the combination candidate selection processing unit 53 selects a moving image that satisfies a predetermined condition as a candidate for a moving image as a combination target even if the types of moving images differ.

With the image capture apparatus 1, it is thereby possible to generate various types of combined moving images, since it is still combinable even if the types of moving images differ such as normal photography, high-speed photography, time lapse photography, and art shot.

Furthermore, the combination candidate selection processing unit 53 selects a moving image that satisfies a predetermined condition as a candidate of a moving image for a combination target, even if the photographic conditions of moving images differ.

With the image capture apparatus 1, it is thereby possible to generate various types of combined moving images, since it is still combinable even if the photographic condition of moving images such as photographing frame rate differs.

Furthermore, the combination candidate selection processing unit 53 selects a moving image that satisfies a predetermined condition as a candidate for a moving image as a combination target, even if the photographing frame rates of the moving images differ.

With the image capture apparatus 1, it is thereby possible to generate various types of combined moving images, since even with time lapse photography in which the photographing frame rates differ depending on the setting, it is still combinable with a moving image which is normal photography or art shot in which photography frame rates may differ.

Furthermore, the combination candidate selection processing unit 53 sets a degree of coincidence of image size or replay frame rate as a predetermined condition.

With the image capture apparatus 1, it is thereby possible to set only a moving image that has an appropriate form for combination as a candidate.

Furthermore, it includes the moving image combination processing unit 55 that generates a moving image by combining a plurality of moving images.

A predetermined condition is a replay time of a moving image generated by the moving image combination processing unit 55 or a remaining capacity of memory as a predetermined condition.

With the image capture apparatus 1, it is thereby possible to provide guidance for only an appropriate moving image for combination as a candidate according to processing ability of an apparatus or a memory state.

The combination candidate selection processing unit 53 can set a replay time.

With the image capture apparatus 1, it is thereby possible for a user to set it according to a balance between processing time and preference.

The moving image combination processing unit 55 can choose whether a moving image as a combination target is combined in front of or behind a moving image which is a basis for combination.

With the image capture apparatus 1, it is thereby not necessary to consider the order of selecting a plurality of images for combination.

The moving image combination processing unit 55 can choose whether additional information of a moving image generated as a result of a combination conforms to a moving image which is a basis for combination or moving image as a combination target.

With the image capture apparatus 1, an intended result of a user can thereby be easily acquired by a later search.

The moving image combination processing unit 55 sets a time stamp or type of a moving image as additional information of the moving image generated as a result of combination.

With the image capture apparatus 1, an intended result of a user can thereby be easily acquired by a later search.

It should be noted that the present invention is not to be limited to the aforementioned embodiment, and that modifications, improvements, etc. within a scope that can achieve the objects of the present invention are also included in the present invention.

Although it is configured so that a candidate of a moving image as a combination target, etc. is displayed on a screen to be choosable in the abovementioned embodiment, it may be configured so that moving images to be displayed as candidates are displayed according to a priority order. The priority order includes cases in which the contents of moving images are similar types, photographed locations of moving images (photographed locations retained in GPS data, etc.) are close, and moving images for which combination is easy, for example.

Furthermore, display of a candidate of a moving image is not limited to displaying an image selectively, and it may be configured so as to display images in a list, to set images that cannot be combined to be hidden, or to display images that cannot be combined by setting the images to be non-choosable and excluding from display that can be chosen.

Furthermore, display of a candidate of a moving image may be configured so as to be changed according to, for example, relevancy of moving image, the difficulty in processing for combination, etc.

Moreover, although combinable moving images are selected regardless of the types of moving images in the abovementioned embodiment, it may be configured such that the types of moving images to be selected are set according to a user's setting.

Furthermore, although the moving images having the same replay frame rates or image sizes are defined as combinable moving images in the abovementioned embodiment, it can be configured so that moving images having different replay frame rates or image sizes are converted so as to establish as combinable moving images.

Furthermore, not limited to replay frame rate, it is also possible to establish as combinable images with the coincidence of photographing frame rate.

Furthermore, although moving images for which the processing load relating to conversion becomes greater are excluded and only predetermined moving images having similar image size, replay frame rate, and the like or that are easily combined are established as a combination target, the present invention is not limited thereto. For example, it is possible to set images such as static images and consecutive images as a combination target. In such a case, the images are coupled as a moving image. For example, in order to configure a moving image with images, in a case of being static images, it can be configured so as to display one image for 3 seconds and combine as a moving image by consecutively arranging the same image for 90 frames. Furthermore, in a case of 5 consecutive images, it can be configured so as to display an image every 3 seconds and combine as a moving image by consecutively arranging the same image for 90 frames. In such a case, it is preferable for the image size to match.

Furthermore, although "high speed 1000", "high speed 480", "high speed 240", and "high speed 120", which can switch between slow and normal upon replaying, are configured so as not to be able to be combined with another type of moving image in the abovementioned embodiment, in a case of the replay frame rate matching, it is possible to be able to combine with another type of moving image by limiting to slow or normal upon replaying.

Furthermore, although it is configured as an image capture apparatus that provides guidance for candidates of moving images that can be combined simply from moving images stored and has a function to finally generate a combined moving image in the abovementioned embodiment, it may be configured as an apparatus that simply provides guidance for candidates of moving images that can be combined or it may be configured to have a function of photographing and generating a moving image which is a basis for combination and a moving image as a combination target using a photographic function of an image capture apparatus.

In the aforementioned embodiments, the digital camera has been described as an example of the image capture apparatus 1 to which the present invention is applied, but the present invention is not limited thereto in particular.

For example, the present invention can be applied to any electronic device in general having moving image combination processing or the combination candidate selection function. More specifically, for example, the present invention can be applied to a lap-top personal computer, a printer, a television, a video camera, a portable navigation device, a smart phone, a cell phone device, a smart phone, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the image capture apparatus 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

While the present invention has been described with reference to the preferred embodiments, it is intended that the invention be not limited by any of the details of the description therein but includes all the embodiments which fall within the scope of the appended claims.

What is claimed is:

1. A moving image selection apparatus comprising:
    a moving image judgment section that, when one moving image is generated by combining a plurality of moving images, judges a possibility of combination between a chosen moving image which is a basis for combination and another moving image based on a predetermined condition;
    a candidate selection section that, based on a judgment result from the moving image judgment section, selects, as at least one candidate moving image for a combination target, at least one moving image that can be combined with the moving image which is the basis for combination, from among a plurality of moving images; and
    a combination target selection section that selects a moving image to be combined with the moving image which is the basis for combination from the at least one candidate moving image for the combination target selected by the candidate selection section,
    wherein the candidate selection section selects a moving image that satisfies the predetermined condition as a candidate moving image for the combination target, even if photographic conditions differ between the moving image and the chosen moving image which is the basis for combination, and
    wherein the candidate selection section selects a moving image that satisfies the predetermined condition as a candidate moving image for the combination target, even if photographing frame rates differ between the moving image and the chosen moving image which is the basis for combination.

2. The moving image selection apparatus according to claim 1, wherein the candidate selection section selects a plurality of candidates for choosing a moving image that is to be combined with the chosen moving image which is the basis for combination, from among the plurality of moving images, by way of the combination target selection section.

3. The moving image selection apparatus according to claim 1, wherein the candidate selection section selects a moving image that satisfies the predetermined condition as a candidate moving image for the combination target even if moving image types differ between the moving image and the chosen moving image which is the basis for combination, wherein each said moving image type corresponds to a moving image type other than the content of each moving image.

4. The moving image selection apparatus according to claim 1, wherein the candidate selection section selects a moving image that satisfies the predetermined condition as a candidate moving image for the combination target, even if photographic conditions differ between the moving image and the chosen moving image which is the basis for combination.

5. A moving image selection apparatus comprising:
a moving image judgment section that, when one moving image is generated by combining a plurality of moving images, judges a possibility of combination between a chosen moving image which is a basis for combination and another moving image based on a predetermined condition;
a candidate selection section that, based on a judgment result from the moving image judgment section, selects, as at least one candidate moving image for a combination target, at least one moving image that can be combined with the moving image which is the basis for combination, from among a plurality of moving images; and
a combination target selection section that selects a moving image to be combined with the moving image which is the basis for combination from the at least one candidate moving image for the combination target selected by the candidate selection section,
wherein the moving image judgment section sets a degree of coincidence of image sizes or replay frame rates as the predetermined condition.

6. A moving image selection apparatus comprising:
a moving image judgment section that, when one moving image is generated by combining a plurality of moving images, judges a possibility of combination between a chosen moving image which is a basis for combination and another moving image based on a predetermined condition;
a candidate selection section that, based on a judgment result from the moving image judgment section, selects, as at least one candidate moving image for a combination target, at least one moving image that can be combined with the moving image which is the basis for combination, from among a plurality of moving images;
a combination target selection section that selects a moving image to be combined with the moving image which is the basis for combination from the at least one candidate moving image for the combination target selected by the candidate selection section; and
a moving image generation section that generates one moving image by combining a plurality of moving images,
wherein the predetermined condition is a replay time of a moving image generated by the moving image generation section or a remaining capacity of memory, and
wherein the moving image generation section can choose whether additional information of a moving image generated as a result of a combination conforms to the moving image which is the basis for combination or the moving image to be combined.

7. The moving image selection apparatus according to claim 6, wherein the moving image judgment section can set the replay time.

8. The moving image selection apparatus according to claim 6, wherein the moving image generation section can choose whether the moving image to be combined is combined in front of or behind the moving image which is the basis for combination.

9. The moving image selection apparatus according to claim 6, wherein the moving image generation section sets a time stamp or a type of moving image as additional information of a moving image generated as a result of combination.

10. A moving image selection method comprising:
a moving image judgment processing that, when one moving image is generated by combining a plurality of moving images, judges a possibility of combination between a chosen moving image which is a basis for combination and another moving image based on a predetermined condition;
a candidate selection processing that, based on a judgment result from the moving image judgment processing, selects, as at least one candidate moving image for a combination target, at least one moving image that can be combined with the moving image which is the basis for combination, from among a plurality of moving images;
a combination target selection processing that selects a moving image to be combined with the moving image which is the basis for combination from the at least one candidate moving image for the combination target selected in the candidate selection processing; and
a moving image generation processing that generates one moving image by combining a plurality of moving images,
wherein the predetermined condition is a replay time of a moving image generated by the moving image generation processing or a remaining capacity of memory, and
wherein the moving image generation processing can choose whether additional information of a moving image generated as a result of a combination conforms to the moving image which is the basis for combination or the moving image to be combined.

11. A moving image selection method comprising:
a moving image judgment processing that, when one moving image is generated by combining a plurality of moving images, judges a possibility of combination between a chosen moving image which is a basis for combination and another moving image based on a predetermined condition;
a candidate selection processing that, based on a judgment result from the moving image judgment processing, selects, as at least one candidate moving image for a combination target, at least one moving image that can be combined with the moving image which is the basis for combination, from among a plurality of moving images; and
a combination target selection processing that selects a moving image to be combined with the moving image which is the basis for combination from the at least one candidate moving image for the combination target selected in the candidate selection processing, wherein the candidate selection processing selects a moving image that satisfies the predetermined condition as a candidate moving image for the combination target, even if photographic conditions differ between the moving image and the chosen moving image which is the basis for combination, and wherein the candidate selection processing selects a moving image that satisfies the predetermined condition as a candidate moving image for the combination target, even if photographing frame rates differ between the moving image and the chosen moving image which is the basis for combination.

12. A moving image selection method comprising:

a moving image judgment processing that, when one moving image is generated by combining a plurality of moving images, judges a possibility of combination between a chosen moving image which is a basis for combination and another moving image based on a predetermined condition;

a candidate selection processing that, based on a judgment result from the moving image judgment processing, selects, as at least one candidate moving image for a combination target, at least one moving image that can be combined with the moving image which is the basis for combination, from among a plurality of moving images; and a combination target selection processing that selects a moving image to be combined with the moving image which is the basis for combination from the at least one candidate moving image for the combination target selected in the candidate selection processing, wherein the moving image judgment processing sets a degree of coincidence of image sizes or replay frame rates as the predetermined condition.

* * * * *